Inventor
E. J. Jacobi

Patented Mar. 1, 1949

2,463,389

UNITED STATES PATENT OFFICE 2,463,389

ELECTRICAL REGULATOR

Ernst Jonas Jacobi, Alingsas, Sweden, assignor to Telefonaktiebolaget L M Ericsson, Stockholm, Sweden, a company of Sweden Application April 20, 1944, Serial No. 531,973
In Sweden January 11, 1943

5 Claims. (Cl. 200—56)

The invention relates to an electrical device adapted for the control of circuits in dependence of the position of the pointer of a measuring instrument, one or more contacts controlling said circuits being arranged along the path of movement of the pointer. Said contacts are thereby operated by means of the periodically operated pointer when being just in front of respective contacts. Such instruments are usually provided with a drop-loop or a stress-loop, the loop thereby during its movement perpendicularly to the path of the pointer operating said pointer, said pointer thereby when being just in front of a contact operating said contact. The function of such instruments is unsatisfactory because the pointer, especially at a rapid alteration of the pointer-deflection, can pass by one or more contacts without operating said contact which of course impedes the proper function of the instrument. The invention has for an object to eliminate this inconvenience.

Figure 6:
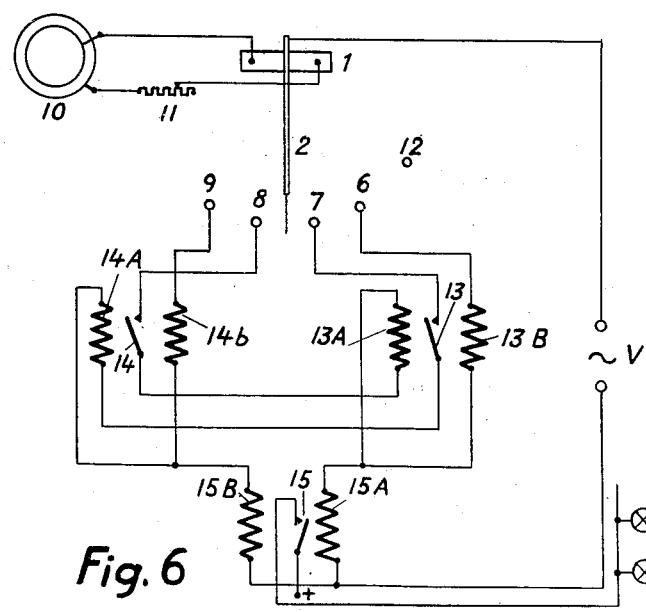

The invention will be more closely described with reference to the accompanying drawing wherein Fig. 1 in perspective shows the fundamental construction of the device. Figs. 2–5 show different positions of the pointer and devices co-operating with the same. Fig. 6 is a connection scheme showing the application of the invention to a certain type of switches.

I indicates the moving coil of the measuring instrument to which the flexible pointer 2 is fastened being knife-shaped in its end 3. At each contact position along the path of the pointer a device consisting of two parts 4 and 5 is arranged. Said parts can for instance be fastened to bars B1 and B2 of a loop moving periodically between two limit-positions perpendicularly to the path of the pointer (i. e. in a vertical direction in Fig. 1) the movement being effected by means of a rotating cam N. The part 5 is provided with a notch S having a triangular form which notch is open towards the pointer. The part 4 arranged just below said notch has also a triangular form.

Figure 1:
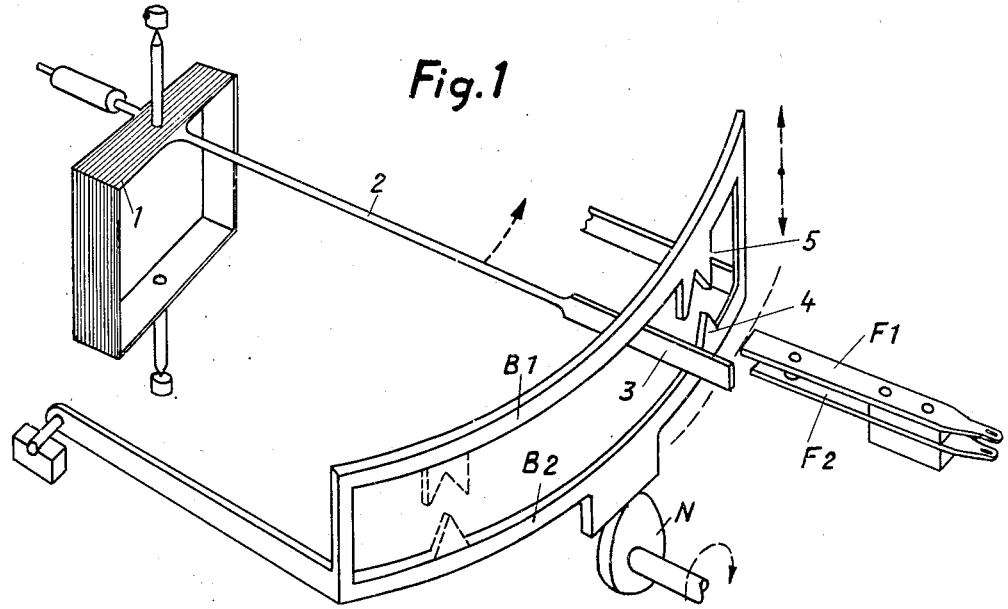
Figure 2:
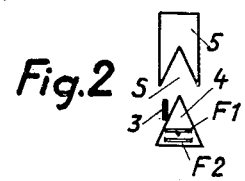
Figure 3:
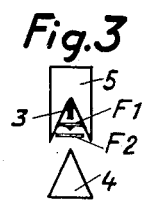
Figure 4:
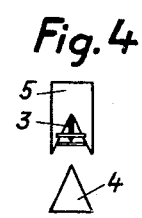
Figure 5:

If the pointer moves in the direction of the dotted arrow in Fig. 1 and the device 4—5 occupies its upper limit-position the pointer will during its movement strike against one side of the part 4 thereby being stopped in its movement as is shown in Fig. 2. When thereafter the device 4—5 upon the movement of the loop is brought downwards, the pointer part 3 will slide into the notch on the part 5 as is shown in Fig. 3. During the continued movement of the device 4—5 downwards (Fig. 4) the pointer will then be pushed against contact-springs F1, F2 (or possibly a mercury switch). When thereafter the device 4—5 is brought upwards during the movement of the loop (Fig. 5), the pointer will again be released so as to be able to move in one direction or the other owing to the magnitude of the current flowing through the coil 1. Of course it is possible to arrange a number of contact positions along the path of movement of said pointer, parts 4 and 5 and springs F1, F2 thereby being disposed at every contact-position, one such additional contact-position for instance being indicated in dotted lines on the left part of the loop in Fig. 1. Every contact position and the corresponding parts 4, 5 are thereby adjustable to an arbitrary position along the path of movement of the pointer. It is evident that by means of the device it is possible to obtain an effective and reliable operating of the contact at each contact position. Of course the parts 4—5 may be constructed in many other ways without departing from the idea of the invention.

The described device can be used for many different purposes. The moving coil-instrument can for instance be connected to a photoelectric cell with or without an amplifier or to a thermo-element. If for instance the thermo-element is placed in a furnace and the springs F1, F2 (and springs of other contact-positions) are connected to heating elements, an automatic fine adjustment of the furnace temperature can be obtained. Each contact arranged in the path of movement of the pointer is thereby adjusted to a certain power which gives a certain temperature. The power adjusted through a certain contact is thereby neutralized through the following contact. If the instrument is used in connection with a photoelectric cell for the control of a certain process, alterations according to the controlled process can be effected automatically.

I claim:

1. In an automatic electric control device, a moving pointer, at least one circuit controlling contact device, means arranged at a point in the path of movement of the pointer and movable angularly with relation to the direction of movement of the pointer to engage and apply the pointer to and thereby operate said contact device, and a member movable with said engaging means to direct the pointer into position for engagement by said engaging means, said means and said member being spaced apart.

2. In an electric control device, a moving pointer, at least one circuit controlling contact device, means arranged at a point in the path of movement of the pointer and movable angularly with relation to the direction of movement of the pointer, said means having a notch therein to embrace and apply the pointer to and thereby operate said contact device during movement of said means, and a member movable with said engaging means to direct the pointer into position for engagement in said notch, said means and said member being spaced apart.

3. In an electric control device, a moving pointer, at least one circuit controlling contact device, means arranged at a point in the path of movement of the pointer and movable angularly with relation to the direction of movement of the pointer, said means having a V-shaped notch therein to embrace and apply the pointer to and thereby operate said contact device during movement of said means, and a V-shaped member movable with said engaging means to direct the pointer into position for engagement in said notch, said means and said member being spaced apart.

4. In an electric control device, a moving pointer, at least one circuit controlling contact device, means arranged at a point in the path of movement of the pointer and movable angularly with relation to the direction of movement of the pointer, said means having a V-shaped notch therein to embrace and apply the pointer to and thereby operate said contact device during movement of said means, and a V-shaped member movable with said engaging means to direct the pointer into position for engagement in said notch, said means and said member being spaced apart, the apex of said V-shaped member being disposed just right under the pointer being embraced in said notch.

5. In an electric control device, a moving pointer, at least one circuit controlling contact device, means arranged at a point in the path of movement of the pointer and movable angularly with relation to the direction of movement of the pointer, said means having a V-shaped notch therein to embrace and apply the pointer to and thereby operate said contact device during movement of said means, and a V-shaped member movable with said engaging means to direct the pointer into position for engagement in said notch, the space between a plane parallel to the moving plane of the pointer through the apex of said V-shaped member and a plane parallel to first mentioned plane and going through the edges of said notch being smaller than the height of said pointer.

ERNST JONAS JACOBI.

REFERENCES CITED

The following references are of record in the file of this patent:

UNITED STATES PATENTS

| Number | Name | Date |
|---|---|---|
| 1,787,176 | Spitzglass | Dec. 30, 1930 |
| 1,916,420 | Harrison | July 4, 1933 |
| 1,969,158 | Side | Aug. 7, 1934 |
| 2,039,230 | Lamb | Apr. 28, 1936 |
| 2,054,380 | Lamb | Sept. 15, 1936 |
| 2,123,470 | Lamb | July 12, 1938 |
| 2,140,601 | Serriere | Dec. 20, 1938 |